United States Patent
Hsieh

(10) Patent No.: US 8,982,448 B2
(45) Date of Patent: Mar. 17, 2015

(54) ELECTROWETTING DEVICE

(71) Applicant: National Chung-Hsing University, Taichung (TW)

(72) Inventor: Incha Hsieh, Sinfon Township, Hsinchu County (TW)

(73) Assignee: National Chung-Hsing University, Taichung (TW)

( * ) Notice: Subject to any disclaimer, the term of this patent is extended or adjusted under 35 U.S.C. 154(b) by 0 days.

(21) Appl. No.: 14/091,330

(22) Filed: Nov. 26, 2013

(65) Prior Publication Data

US 2014/0153079 A1    Jun. 5, 2014

(30) Foreign Application Priority Data

Nov. 30, 2012    (TW) .............................. 101144994 A

(51) Int. Cl.
  *G02B 26/00* (2006.01)
  *G09G 3/34* (2006.01)
  *G02B 26/02* (2006.01)
  (Continued)

(52) U.S. Cl.
  CPC ............ *G02B 26/005* (2013.01); *G02B 26/004* (2013.01); *G02B 26/026* (2013.01); *G09G 3/34* (2013.01); *G09G 3/344* (2013.01); *G09G 3/3453* (2013.01); *G09G 3/348* (2013.01); *G02F 1/09* (2013.01); *G02F 1/167* (2013.01); *G02F 2001/094* (2013.01); *B41J 2/14* (2013.01); *B43K 5/10* (2013.01); *G02B 26/02* (2013.01)
  USPC ........... 359/296; 359/290; 359/228; 359/245; 345/107; 345/49

(58) Field of Classification Search
  CPC .... G02B 26/00; G02B 26/004; G02B 26/005; G02B 26/02; G02B 26/026; G02F 1/00; G02F 1/09; G02F 1/091; G02F 1/167; G02F 2001/094; G09G 3/00; G09G 3/34; G09G 3/3433; G09G 3/344; G09G 3/3453; G09G 3/348; B41J 2/14; B43K 5/10
  USPC ............ 359/290, 291, 295, 296, 228; 345/49, 345/84, 105, 107
  See application file for complete search history.

(56) References Cited

U.S. PATENT DOCUMENTS

| | | | | |
|---|---|---|---|---|
| 4,573,819 A | * | 3/1986 | Herrnring | 401/151 |
| 6,048,920 A | * | 4/2000 | Ziolo et al. | 524/435 |

(Continued)

FOREIGN PATENT DOCUMENTS

| | | |
|---|---|---|
| EP | 1798958 A1 | 6/2007 |
| WO | 2006017129 A2 | 2/2006 |
| WO | 2007101174 A2 | 9/2007 |

OTHER PUBLICATIONS

European Search Report dated Mar. 4, 2014 for EP Application No. 13194756.6.

*Primary Examiner* — Loha Ben
(74) *Attorney, Agent, or Firm* — The Mueller Law Office, P.C.

(57) ABSTRACT

An electrowetting device includes: a liquid-confining member including a base and an electrode unit supported on the base, the liquid-confining member defining an inner chamber; a first liquid of a magnetic ink disposed in the inner chamber; and a second liquid of a polar material disposed in the inner chamber and immiscible with the first liquid. The first and second liquids contact each other to define a liquid-liquid interface therebetween.

6 Claims, 5 Drawing Sheets

(51) Int. Cl.
  *G02F 1/09* (2006.01)
  *G02F 1/167* (2006.01)
  *B41J 2/14* (2006.01)
  *B43K 5/10* (2006.01)

(56) References Cited

U.S. PATENT DOCUMENTS

| | | | |
|---|---|---|---|
| 6,336,697 B1 * | 1/2002 | Fukushima | 347/20 |
| 6,449,081 B1 * | 9/2002 | Onuki et al. | 359/245 |
| 6,514,328 B1 * | 2/2003 | Katoh et al. | 106/31.28 |
| 6,517,618 B2 * | 2/2003 | Foucher et al. | 106/31.16 |
| 6,574,034 B1 * | 6/2003 | Lin et al. | 359/296 |
| 7,307,672 B2 * | 12/2007 | Feenstra et al. | 349/15 |
| 7,463,398 B2 * | 12/2008 | Feenstra et al. | 359/253 |
| 7,548,363 B2 * | 6/2009 | Hayes et al. | 359/276 |
| 8,508,436 B2 * | 8/2013 | Jessop | 345/49 |
| 8,691,147 B2 * | 4/2014 | Leck et al. | 422/63 |
| 2012/0073740 A1 | 3/2012 | Hsieh | |
| 2014/0154404 A1 * | 6/2014 | Hsieh | 427/58 |

\* cited by examiner

ELECTROWETTING DEVICE

CROSS-REFERENCE TO RELATED APPLICATION

This application claims priority of Taiwanese Patent Application No. 101144994, filed on Nov. 30, 2012.

BACKGROUND OF THE INVENTION

1. Field of the Invention

This invention relates to an electrowetting device, more particularly to an electrowetting device including a magnetic ink.

2. Description of the Related Art

An electrowetting device typically includes a housing and a working liquid that is encapsulated in the housing and that changes its surface tension when an external power source is applied to the working liquid for controlling operation modes of the working liquid. The electrowetting device may be used in applications, such as displays, an optical liquid lens, a biochip, etc.

U.S. patent application publication No. 2012/0073740 discloses a method of making an electrowetting device. The method includes the steps of: (a) forming a surrounding wall on an upper surface of a substrate to define a micro-chamber, the surrounding wall having an inner surface surrounding the micro-chamber and a top surface above the inner surface, the upper surface of the substrate being non-hydrophobic; (b) coating the surrounding wall and the upper surface of the substrate with a hydrophobic coating material; (c) removing a portion of the hydrophobic coating material formed on the top surface of the surrounding wall, thereby exposing the top surface of the surrounding wall; and (d) filling a first liquid and a second liquid, which is immiscible with the first liquid, into the micro-chamber. The first liquid is a colored ink, and the second liquid is an electroconductive solution.

The first liquid is required to be firmly positioned at a predetermined region in the micro-chamber and be covered by the second liquid when the second liquid is introduced therein, so that the electrowetting device can work normally and reliably. However, since the first liquid has a density smaller than that of the second liquid, control of the aforesaid positioning and covering of the first liquid is relatively difficult.

SUMMARY OF THE INVENTION

An object of the present invention is to provide a highly reliable electrowetting device.

According to this invention, there is provided an electrowetting device that comprises: a liquid-confining member including a base and an electrode unit supported on the base, the liquid-confining member defining an inner chamber; a first liquid of a magnetic ink disposed in the inner chamber; and a second liquid of a polar material disposed in the inner chamber and immiscible with the first liquid, the first and second liquids contacting each other to define a liquid-liquid interface therebetween. The electrode unit is adapted to be connected to an external power source for providing an electric field across the liquid-liquid interface. The liquid-liquid interface has a shape that varies in response to a change in the electric field across the liquid-liquid interface.

BRIEF DESCRIPTION OF THE DRAWINGS

In drawings which illustrate embodiments of the invention.

DETAILED DESCRIPTION OF THE PREFERRED EMBODIMENTS

Figure 1:
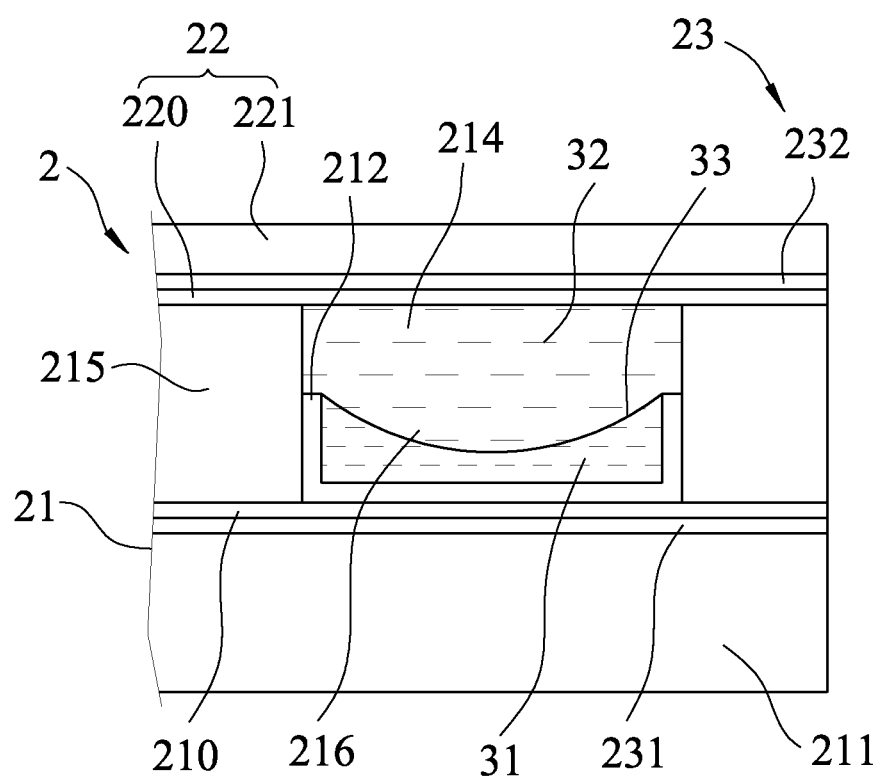
FIG. 1 is a schematic diagram of the first preferred embodiment of an electrowetting device according to the present invention.
Figure 2A:
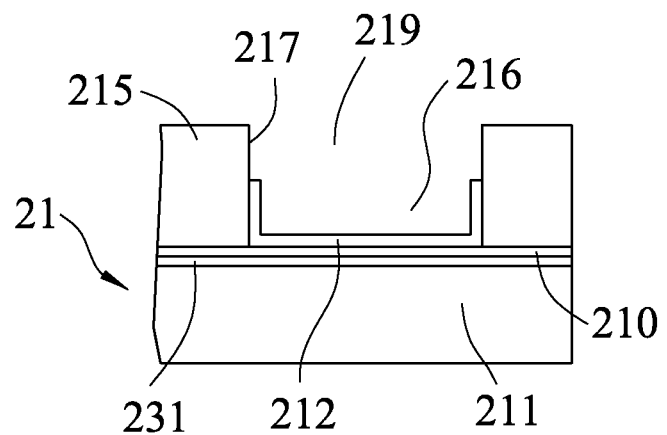
FIGS. 2A to 2D are schematic diagrams illustrating consecutive steps of a method of making the first preferred embodiment of the electrowetting device according to the present invention.
Figure 2B:
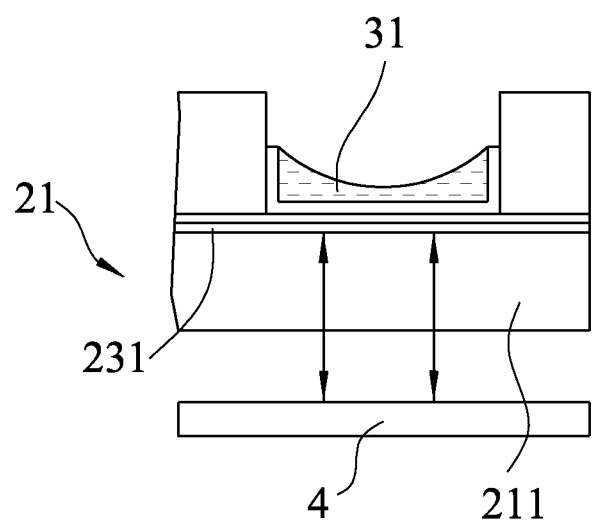
Figure 2C:
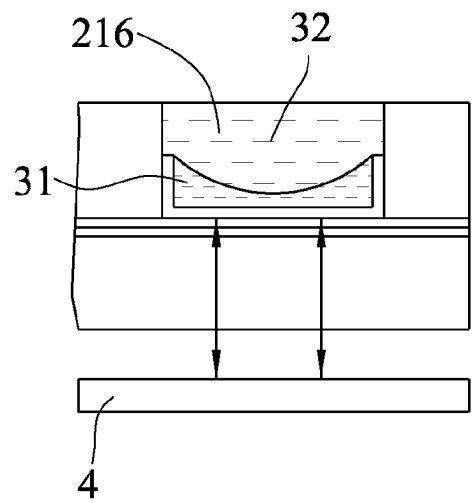
Figure 2D:
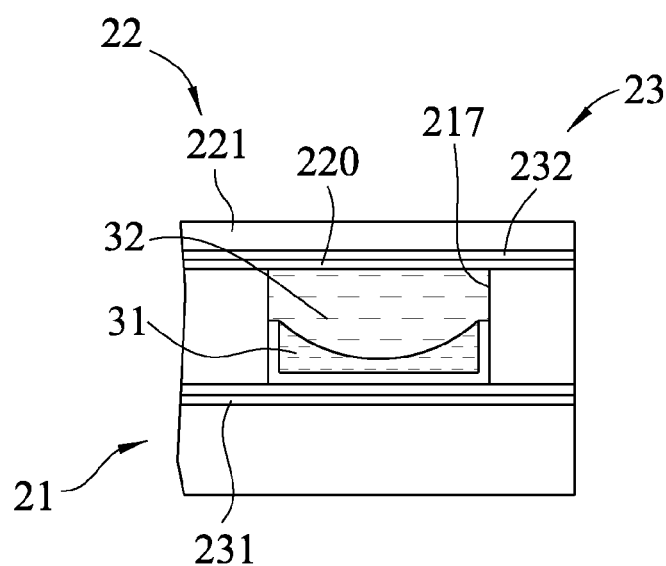

FIG. 1 illustrates the first preferred embodiment of an electrowetting device according to the present invention.

The electrowetting device comprises: a liquid-confining member 2 including a base 21 and an electrode unit 23 supported on the base 21, the liquid-confining member 2 defining an enclosed inner chamber 214; a first liquid 31 of a magnetic ink disposed in the inner chamber 214; and a second liquid 32 of a polar material disposed in the inner chamber 214 and immiscible with the first liquid 31. The first and second liquids 31, 32 contact each other to define a liquid-liquid interface 33 therebetween.

The electrode unit 23 is adapted to be connected to an external power source (not shown) for providing an electric field across the liquid-liquid interface 33.

The liquid-liquid interface 33 has a shape that varies in response to a change in the electric field across the liquid-liquid interface 33. It is noted that the liquid-liquid interface 33 does not vary in response to a change in the magnetic field.

The first liquid 31 includes magnetic pigment particles and a nonpolar solvent. In the first preferred embodiment, the nonpolar solvent of the first liquid 31 is made from a material selected from a hydrocarbon solvent, such as n-hexane, dodecanese, and octadecane, or silicone oil. The first liquid 31 is hydrophobic, and can be driven by the electric field to deform in the inner chamber 214, thereby varying the shape of the liquid-liquid interface 33.

The second liquid 32 is a polar solvent. In the first preferred embodiment, the second liquid 32 is water.

The magnetic pigment particles of the first liquid 31 have an average particle size of not greater than 50 nm, and preferably impart a desired color under certain operation modes of the electrowetting device.

Preferably, the magnetic pigment particles of the first liquid 31 are made from hydrophobic group modified ferric oxide.

In the first preferred embodiment, the liquid-confining member 2 further includes a cover 22 covering the base 21. The base 21 includes: a lower substrate 211 that is opposite to the cover 22 in a vertical direction; a surrounding barricade 215 which extends from the lower substrate 211 in the vertical direction and which cooperates with the lower substrate 211 to define an inner space 216 therebetween; and a hydrophobic layer 212 formed in the inner space 216. The electrode unit 23 includes a lower electrode 231 provided on the lower substrate 211, and an upper electrode 232 provided on the cover 22.

The lower electrode 231 cooperates with the upper electrode 232, the first and second liquids 31, 32 and the external power source (not shown) to form a circuit.

The base 21 of the liquid-confining member 2 further includes a lower dielectric layer 210 that is formed on the lower electrode 231. The cover 22 of the liquid-confining member 2 includes an upper dielectric layer 220 that is formed on the surrounding barricade 215, and a transparent panel 221 that is formed on the dielectric layer 220. The upper electrode 232 is disposed between the dielectric layer 220 and the transparent panel 221.

It is noted that the shape of the first liquid 31 in the inner chamber 214 is concave, and can be controlled by not only the electric field applied thereto but also the height of the hydrophobic layer 212. The higher the hydrophobic layer 212, the lower will be the height of a central portion of the first liquid 31 and the higher will be a peripheral portion of the first liquid 31 in the inner chamber 214.

The surrounding barricade 215 has a height greater than that of the hydrophobic layer 212 so as to prevent the first liquid 31 from overflowing out of the inner space 216.

FIGS. 2A to 2D illustrate consecutive steps of a method of making the first preferred embodiment of the electrowetting device according to the present invention. The method comprises: (a) providing the base 21 that defines an inner space 216 and that has an open end 217 which defines an opening 219 (see FIG. 2A); (b) applying the first liquid 31 of the magnetic ink to a predetermined region of the base 21 within the inner space 216; (c) positioning the first liquid 31 on the predetermined region of the base 21 using a magnetic unit 4 that is magnetically attractive to the first liquid 31 (see FIG. 2B); (d) filling the inner space 216 with the second liquid 32 that is immiscible with the first liquid 31 (see FIG. 2C); and (e) attaching sealingly the cover 22 to the open end 217 of the base 21 and covering the opening 219 with the cover 22 (see FIG. 2D).

Referring to FIG. 1, the lower electrode 231 is made from a conductor film of indium-tin-oxide, and has a thickness not less than 400Å. The lower dielectric layer 210 is made from SiN, and has a thickness of around 2000 Å. The surrounding barricade 215 is made from a photo resist material, and is formed on the lower dielectric layer 210. The hydrophobic layer 212 is made from hydrophobic compounds, and is formed on the lower dielectric layer 210 and the surrounding barricade 215.

The surrounding barricade 215 is formed on the lower dielectric layer 210 using spin coating, dipping, or curtain coating techniques. In the first preferred embodiment, the hydrophobic layer 212 is made from a Teflon material, and is formed using spin coating techniques.

It is noted that a height difference between the hydrophobic layer 212 and the surrounding barricade 215 can be controlled by controlling an amount of the hydrophobic compound used for forming the hydrophobic layer 212, or by controlling the process of forming the surrounding barricade 215. More specifically, to form the hydrophobic layer 212 and the surrounding barricade 215 with a height difference therebetween, a pattern of a first photoresist layer is first formed on the lower dielectric layer 210 using photolithography processing techniques, a hydrophobic film is then formed on the first photoresist layer and the lower dielectric layer 210 exposed from the first photoresist layer using spin coating techniques, a top portion of the hydrophobic film on a top end of the first photoresist layer is removed using mechanical polishing techniques, and a second photoresist layer is formed on the top end of the first photoresist layer using photolithography processing techniques. The first and second photoresist layers cooperatively define the surrounding barricade 215, and the hydrophobic film defines the hydrophobic layer 212 and has a height the same as that of the first photoresist layer.

The magnetic unit 4 is a material selected from a permanent magnet, an electromagnet, magnetic coils, and the like. In the first preferred embodiment, the magnetic unit 4 is a permanent magnet.

The hydrophobic group modified ferric oxide is formed by thermally decompounding iron-oleate complex in a hydrocarbon solvent. The hydrophobic group modified ferric oxide thus formed has lipophilic groups so as to be dispersed uniformly in an oil solvent.

In one embodiment, the magnetic ink containing the hydrophobic group modified ferric oxide was formed by: mixing 36 g sodium oleate complex, 80 g ethanol, 60 ml deionized water, 140 ml Hexane, and 10.8 g ferric chloride to form a first mixture; stirring the first mixture for 4 hours at 70° C.; washing the first mixture with deionized water in a separating funnel so as to obtain an iron-oleate complex; mixing 36 g of the iron-oleate complex, 5.7 g oleic acid, and 200 g 1-octadecane to form a second mixture; heating the second mixture to 320° C. in a heating rate of 5° C. per minute and maintaining the temperature at 320° C. for 30 minutes; cooling the second mixture; and mixing the second mixture and a non-polar solvent so as to form the magnetic ink.

The application of the first liquid 31 in the inner space 216 may be conducted using inkjet printing techniques. The filling of the second liquid 32 in the inner space 216 to cover the first liquid 31 may be conducted using inkjet printing techniques.

Figure 3:
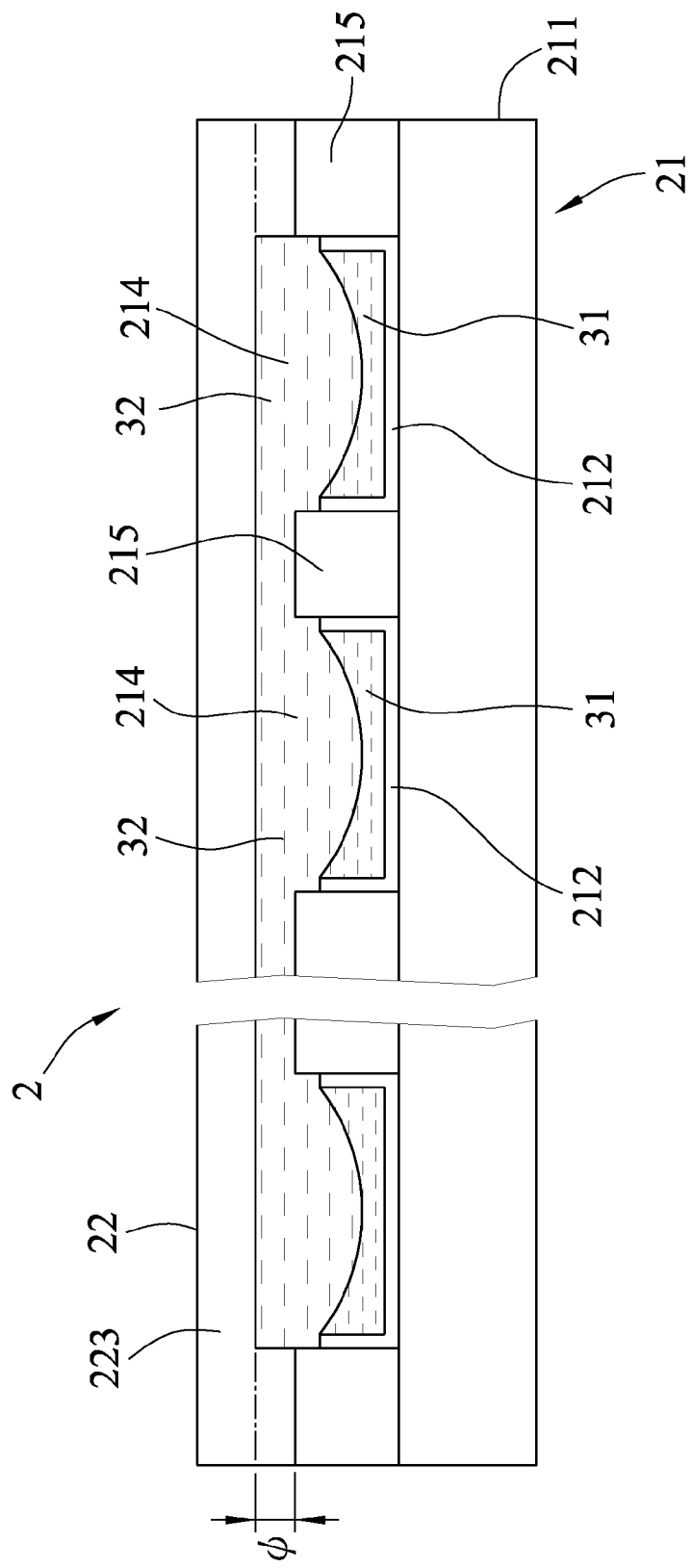
FIG. 3. is a schematic diagram of the second preferred embodiment of the electrowetting device according to the present invention.

FIG. 3 illustrates the second preferred embodiment of the electrowetting device according to the present invention. The second preferred embodiment differs from the previous preferred embodiment mainly in that, in this preferred embodiment, the liquid-confining member 2 defines a plurality of unit cells each of which defines an inner chamber 214 that receives the first and second liquids 31, 32 therein. A gap φ is formed between the top end of the surrounding barricade 215 and a top region 223 of the cover 22, such that fluid communication of the second liquid 32 between two adjacent ones of the inner chambers 214 of the unit cells is permitted through the gap φ.

Figure 4:
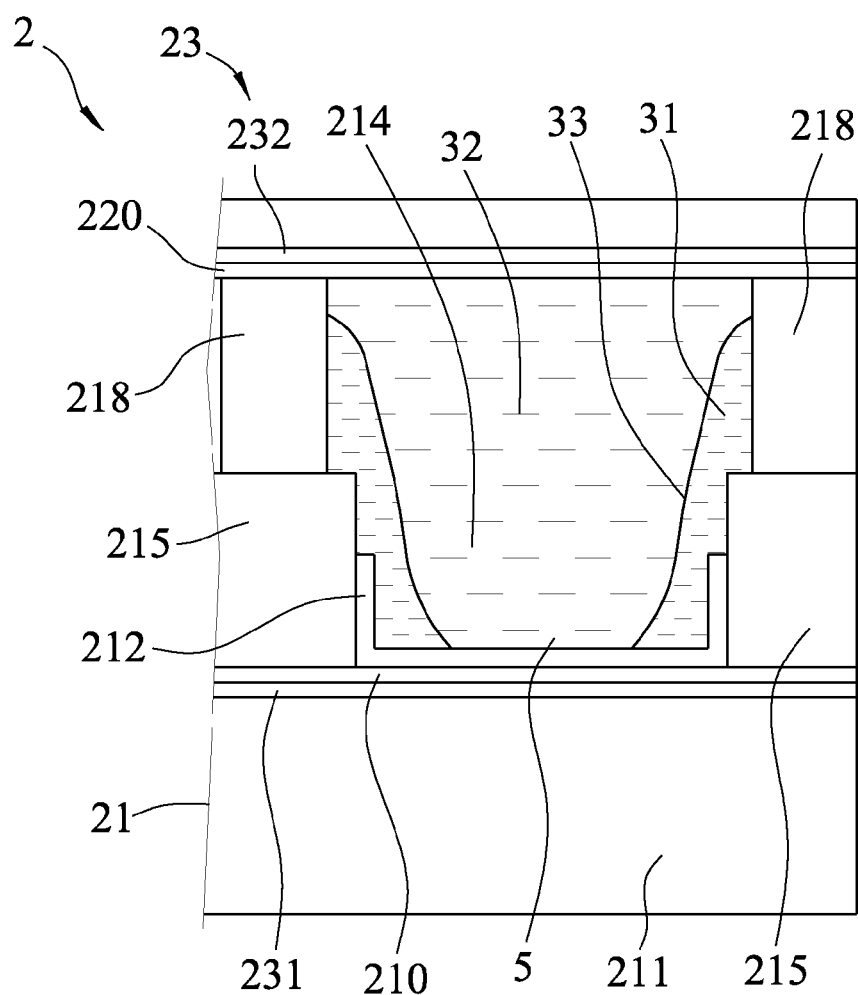
FIG. 4 is a schematic diagram of the third preferred embodiment of the electrowetting device according to the present invention.

FIG. 4 illustrates the third preferred embodiment of the electrowetting device according to the present invention. The third preferred embodiment differs from the first preferred embodiment in that the base 21 further includes a hydrophilic wall 218 which extends between and interconnects the surrounding barricade 215 and the upper dielectric layer 220 and which cooperates with the upper dielectric layer 220 of the cover 22, the hydrophobic layer 212 and the surrounding barricade 215 to define the inner chamber 214. FIG. 4 also illustrates an operating state of the electrowetting device, where the first liquid 31, which acts as a valve, is disposed at an opening position.

The inclusion of the hydrophilic wall 218 in the liquid-confining member 2 permits an increase in an aperture ratio of the first liquid 31, which is formed with a central opening 5 when disposed at the opening position, so as to increase the resolution and the contrast ratio of the electrowetting device.

The hydrophilic wall 218 may be made from polyimide, and may be formed on the surrounding barricade 215 by photolithographic processing and etching techniques.

The method of making the third preferred embodiment differs from the method of making the first preferred embodiment mainly in the inclusion of an additional step (f) of forming the hydrophilic wall 218 and the implementation of the filling of the second liquid 32 and the closing of the opening 219 in the aforesaid steps (d) and (e). Specifically, in the method of making the third preferred embodiment, steps (f), (d), and (e) are conducted by: forming the hydrophilic wall 218 on the cover 22 by photolithographic processing and etching techniques such that the hydrophilic wall 218 cooperates with the cover 22 to define a recess; filling the second liquid 32 in the recess; inverting the base 21 which is filled with the first liquid 31 that is positioned by the magnetic unit 4; and attaching the surrounding barricade 215 of the base 21 to a top end of the hydrophilic wall 218 and re-inverting the base 21, such that the base 21 is disposed below the recess so as to permit the second liquid 32 to flow into the inner space 216 and the cover 22 to cover the opening 219.

Since the first liquid 31 is made from the magnetic ink, the same can be positioned in the inner space 216 by the magnetic unit 4 during filling of the second liquid 32 in the inner space 216, thereby preventing undesired malposition of the first liquid 31 during filling of the second liquid 32 in the inner space 216. Hence, with the inclusion of the first liquid 31 of the magnetic ink in the electrowetting device of this invention, a highly reliable electrowetting device may be obtained.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. An electrowetting device comprising:
    a liquid-confining member including a base and an electrode unit supported on said base, said liquid-confining member defining an inner chamber;
    a first liquid of a magnetic ink disposed in said inner chamber; and
    a second liquid of a polar material disposed in said inner chamber and immiscible with said first liquid, said first and second liquids contacting each other to define a liquid-liquid interface therebetween;
    wherein said electrode unit is adapted to be connected to an external power source for providing an electric field across said liquid-liquid interface; and
    wherein said liquid-liquid interface has a shape that varies in response to a change in the electric field across said liquid-liquid interface.

2. The electrowetting device of claim 1, wherein said first liquid includes magnetic pigment particles and a nonpolar solvent.

3. The electrowetting device of claim 2, wherein said magnetic pigment particles have an average particle size of not greater than 50 nm.

4. The electrowetting device of claim 2, wherein said magnetic pigment particles are made from hydrophobic group modified ferric oxide.

5. The electrowetting device of claim 1, wherein said liquid-confining member further includes a cover covering said base, said base including; a lower substrate that is opposite to said cover in a vertical direction; a surrounding barricade which extends from said lower substrate in the vertical direction and which cooperates with said lower substrate to define an inner space therebetween; and a hydrophobic layer formed in said inner space, said electrode unit including a lower electrode provided on said lower substrate, and an upper electrode provided on said cover.

6. The electrowetting device of claim 5, wherein said base further includes a hydrophilic wall which extends between said surrounding barricade and said cover and which cooperates with said cover, said hydrophobic layer and said surrounding barricade to define said inner chamber.

* * * * *